United States Patent
Case, Jr.

(10) Patent No.: US 10,116,874 B2
(45) Date of Patent: Oct. 30, 2018

(54) ADAPTIVE CAMERA FIELD-OF-VIEW

(71) Applicant: Microsoft Technology Licensing, LLC, Redmond, WA (US)

(72) Inventor: Charlie W. Case, Jr., Lake Oswego, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 97 days.

(21) Appl. No.: 15/199,733

(22) Filed: Jun. 30, 2016

(65) Prior Publication Data

US 2018/0007280 A1    Jan. 4, 2018

(51) Int. Cl.
*H04N 5/232*    (2006.01)

(52) U.S. Cl.
CPC ..... *H04N 5/23296* (2013.01); *H04N 5/23216* (2013.01); *H04N 5/23293* (2013.01)

(58) Field of Classification Search
CPC .......... H04N 5/23296; H04N 5/23216; H04N 5/23293
See application file for complete search history.

(56) References Cited

U.S. PATENT DOCUMENTS

| | | | |
|---|---|---|---|
| 7,037,258 B2 | 5/2006 | Chatenever et al. | |
| 8,964,029 B2 | 2/2015 | Finn et al. | |
| 8,976,160 B2 | 3/2015 | Vilcovsky et al. | |
| 2003/0174307 A1 | 9/2003 | Kalinski et al. | |
| 2006/0033819 A1 | 2/2006 | Ozaki et al. | |
| 2006/0146009 A1 | 7/2006 | Syrbe et al. | |
| 2010/0328431 A1 | 12/2010 | Kim et al. | |
| 2011/0018904 A1 | 1/2011 | Tang | |
| 2012/0105573 A1 | 5/2012 | Apostolopoulos | |
| 2012/0314899 A1 | 12/2012 | Cohen et al. | |

(Continued)

FOREIGN PATENT DOCUMENTS

WO    2000034803 A2    6/2000

OTHER PUBLICATIONS

Sun, et al., "Region of Interest Extraction and Virtual Camera Control Based on Panoramic Video Capturing", in Proceedings of IEEE Transactions on Multimedia vol. 7, Issue 5, Oct. 2005, pp. 1-14.

(Continued)

*Primary Examiner* — Twyler Haskins
*Assistant Examiner* — Fayez Bhuiyan
(74) *Attorney, Agent, or Firm* — Alleman Hall Creasman & Tuttle LLP

(57) ABSTRACT

Examples are disclosed that relate to adapting image output from a camera based on output from an orientation sensor. One example provides a display device comprising a display, a movable mount, a camera having an optical field-of-view, an orientation sensor, and a controller. The controller may be configured to receive image output from the camera, generate, based on the image output, a first clipped field-of-view of the camera comprising a target, and in response to a change in an orientation of the camera identified by output from the orientation sensor, generate, based on the image output and the output from the orientation sensor, a second clipped field-of-view comprising the target, the first and second clipped field-of-views being subsets of the optical field-of-view.

20 Claims, 7 Drawing Sheets

(56) References Cited

U.S. PATENT DOCUMENTS

| | | |
|---|---|---|
| 2013/0044258 A1 | 2/2013 | Dennis |
| 2014/0218291 A1 | 8/2014 | Kirk |
| 2014/0253667 A1 | 9/2014 | Tian |
| 2014/0270744 A1 | 9/2014 | Webb et al. |
| 2014/0362188 A1* | 12/2014 | Yokokawa .............. A63F 13/42 348/47 |
| 2015/0348325 A1 | 12/2015 | Voss |
| 2016/0185297 A1* | 6/2016 | Boehm .................... B60R 1/12 348/148 |

OTHER PUBLICATIONS

Winter, Katy., "Von Bismark feature in the Daily Mail", Published on: May 21, 2014 Available at: http://vonbismark.com/dailymail/.
"International Search Report and Written Opinion Issued in PCT Application No. PCT/US2017/037103", dated Aug. 31, 2017, 12 pages.

* cited by examiner

ADAPTIVE CAMERA FIELD-OF-VIEW

BACKGROUND

Cameras are frequently used in conjunction with displays. A camera may be coupled to a display for use as a webcam, for example. When the display is reoriented, the area imaged by the camera may change such that a subject imaged in a previous orientation is no longer visible or is in a suboptimal location. To compensate, a mechanism such as a rotatable mount may be provided to enable user adjustment of the camera orientation following display repositioning.

SUMMARY

Examples are disclosed that relate to adapting image output from a camera based on output from an orientation sensor. One example provides a display device comprising a display, a movable mount, a camera having an optical field-of-view, an orientation sensor, and a controller. The controller may be configured to receive image output from the camera, generate, based on the image output, a first clipped field-of-view of the camera comprising a target, and in response to a change in an orientation of the camera identified by output from the orientation sensor, generate, based on the image output and the output from the orientation sensor, a second clipped field-of-view comprising the target, the first and second clipped field-of-views being subsets of the optical field-of-view.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, cameras are frequently used in conjunction with displays. A camera may be coupled to a display for use as a webcam, for example. When the display is reoriented (e.g., translated and/or rotated), the region of interest imaged by the camera may change such that a subject imaged in a previous location and/or orientation is no longer visible or is in a suboptimal location. To compensate, a mechanism such as a rotatable mount may be provided to enable user adjustment of the camera orientation following display reorientation. While the subject can be returned to a desired location within the camera region of interest by actuating the mechanism, actuation requires user intervention, and the mechanism introduces added cost and complexity to the camera/display system.

Accordingly, examples are disclosed that relate to adapting image output from a camera based on output from an orientation sensor. As described in further detail below, a controller may be configured to generate a first clipped FOV of the camera based on the image output, where the first clipped FOV comprises a target. In response to a change in the orientation of the camera, the controller may be further configured to generate a second clipped FOV based on the image output and orientation sensor output. The second clipped FOV may also comprise the target, and, along with the first clipped FOV, may be a subset of an optical FOV of the camera.

Figure 1A:
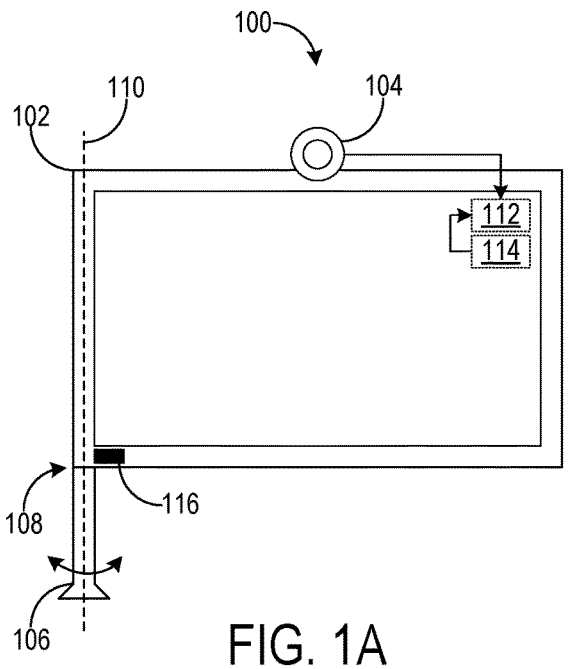
FIGS. 1A-1E show example display devices.

FIG. 1A shows an example display device 100. Display device 100 comprises a display 102 and a camera 104, which are both coupled to a movable mount 106. Movable mount 106 enables changes in the orientation of display 102 and camera 104, as the movable mount may support display and camera rotation about a pivot 108 where the movable mount is coupled to the display. As such, display device 100 may be rotatable about an axis 110 of movable mount 106, which in FIG. 1A is shown on the left hand side of the display device. However, movable mount 106 may enable rotation about alternative or additional axes (e.g., horizontal and/or z-axes) and thus rotation with one, two, or three degrees of rotational freedom.

Figure 1B:
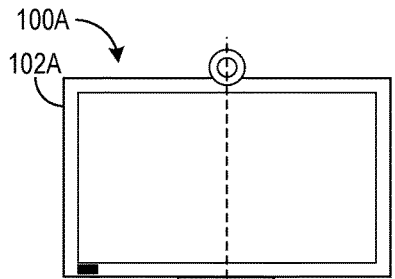
Figure 1C:
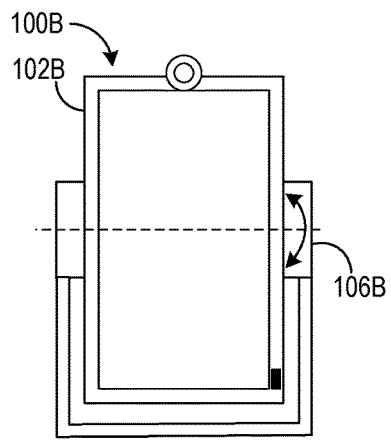
Figure 1D:
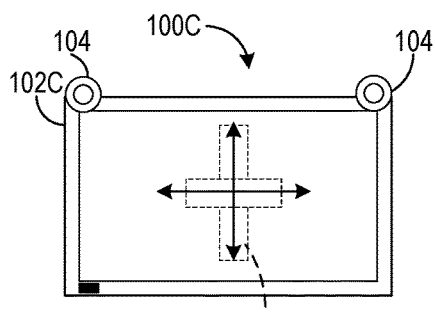
Figure 1E:
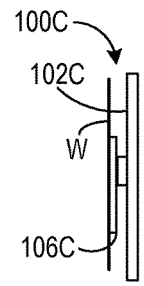

Other mount configurations are illustrated in FIGS. 1B-1E. For example, FIG. 1B illustrates a display device 100A having a display 102A coupled by a central movable mount 106A that pivots the display 102A about a central vertical pivot axis, rather than the left side vertical axis of FIG. 1A. In addition, FIG. 1C depicts a display device 100B having display 102B coupled by a movable mount 106B that pivots the display 102B about a central horizontal pivot axis. FIGS. 1D and 1E picture front and side views of a display device 100C that includes a display 102C mounted via a mount 106C to a wall W, the mount being movable and configured for vertical and horizontal translational movement as shown by the arrows in FIG. 1D. Further, in other implementations movable mount 106 may enable adjustment of the orientation of one and not both of display 102 and camera 104, or separate mounts may be provided for the display and camera. Generally, movable mount 106 may enable users to change the orientation of display device 100, for example to optimize viewing angles and/or adjust the region of interest of camera 104. To this end, movable mount 106 may assume any suitable form, including those that support translation of display device 100, alternatively or in addition to rotation.

Returning to FIG. 1A, display device 100 includes a controller 112 configured to receive image output from camera 104. Controller 112 is a hardware component, and as such may process the image output from camera 104 in various manners. As described in further detail below, processing the image output may include generating a clipped field-of-view (FOV) that is a subset of an optical FOV of camera 104. Controller 112 may generate the clipped FOV by discarding image data (e.g., pixels) from camera 104 outside of the clipped FOV. The clipped FOV may be selected such that desired target(s) are captured within the clipped FOV, allowing undesired image data outside of the clipped FOV to be discarded. In this way, the processing, memory, and bandwidth load associated with processing image data in the clipped FOV may be reduced by virtue of comprising relatively less image data than would be captured were the optical FOV of camera 104 used. As also described below, different clipped FOVs may be generated as the orientation of camera 104 is adjusted to enable the persistent tracking of desired target(s). In other examples, processing the image output from camera 104 may include additively expanding a clipped FOV as the camera orientation is adjusted, by using increasingly larger portions of the optical FOV to provide image data. Conversely, the clipped FOV may be subtractively reduced as the camera orientation is adjusted. To enable these and other types of image processing, camera 104 may comprise a relatively large optical FOV and/or resolution. Additional detail regarding the processing of image data from camera 104 is described below with reference to FIGS. 2-5.

Figure 2:
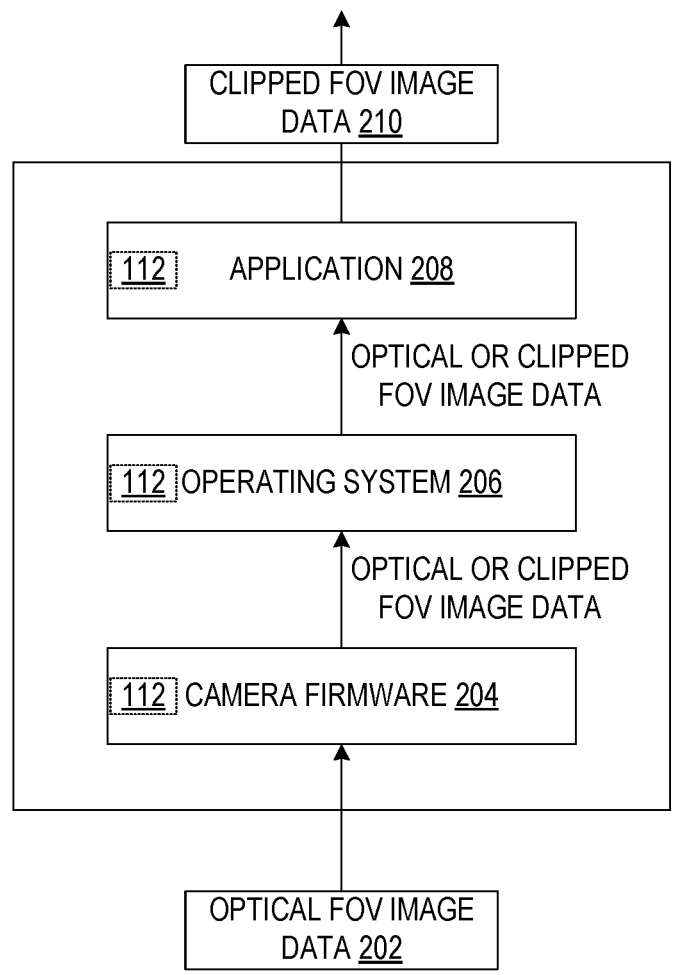
FIG. 2 schematically depicts various approaches to generating a clipped FOV at the display device of FIG. 1A.

Controller 112 may generate a clipped FOV of camera 104 in various suitable manners. With reference to FIG. 1A throughout, FIG. 2 schematically depicts various approaches to generating a clipped FOV at display device 100. In the depicted example, image data 202 captured using the optical FOV of camera 104 (e.g., the entirety of the optical FOV) is received by firmware 204 installed on the camera. Firmware 204 may generate a clipped FOV that is a subset of the optical FOV by discarding image data outside of the clipped FOV, and pass image data within the clipped FOV to an operating system 206 of display device 100. As such, controller 112 may be implemented as a processor executing firmware 204 of camera 104. Alternatively, firmware 204 may not perform clipping, and instead pass image data 202 corresponding to the optical FOV to operating system 206. For examples in which operating system 206 receives image data 202, the operating system may discard image data outside of the clipped FOV to thereby generate the clipped FOV. As such, controller 112 may be implemented as a processor executing an operating system 206 (e.g., as a driver for camera 104) on display device 100. Alternatively, operating system 206 may not perform clipping, and instead pass image data 202 to an application program 208 running on the operating system. In this example, application program 208 may discard image data outside of the clipped FOV to thereby generate the clipped FOV. As such, controller 112 may be implemented as a processor executing an application program 208. Regardless of the origin of clipped image data, FIG. 2 shows the output of image data 210 corresponding to the clipped FOV, which may be sent to any suitable location or device—e.g., to display 102 for visual perception by users. While not shown in FIG. 1A or 2, display 102 may include a processor and storage device holding instructions executable to effect the approaches described herein, such as image clipping at operating system 206 or application program 208. Additional detail regarding example computing device hardware is described below with reference to FIG. 6. Further, the image clipping strategies illustrated in FIG. 2 may apply to display devices 100A-C of FIGS. 1B-1E.

As described above, the adaptation of image output from camera 104 and selection of clipped FOVs from the optical FOV of the camera may be performed in response to changes in camera orientation. To this end, display device 100 includes an orientation sensor 114 shown in FIG. 1A and configured to provide output to controller 112. Orientation sensor 114 may identify changes to the orientation of movable mount 106 and thus changes to the orientation of camera 104. The configuration of orientation sensor 114 may assume various suitable forms—for example, the orientation sensor may comprise an accelerometer for measuring the acceleration of camera 104 including the acceleration due to gravity. Orientation sensor 114 may alternatively or additionally comprise a gyroscope for measuring angular orientation and/or a compass for measuring direction relative to magnetic north. In one example, orientation sensor 114 may include an accelerometer and gyroscope for implementing an inertial measurement unit (IMU). As orientation sensor 114 may sense aspects of position, the orientation sensor may be alternatively or additionally referred to as a position sensor.

Controller 112 may utilize the output from orientation sensor 114 in any suitable manner. In some examples, controller 112 may expand or contract a FOV in proportion to the magnitude of rotational and/or translational motion as identified by orientation sensor 114. In other examples, controller 112 may persistently track a target by determining a second FOV offset from a first initial FOV by an amount in proportion to the magnitude of rotational and/or translational motion as identified by orientation sensor 114. Further, while FIG. 1A depicts its inclusion in display 102, orientation sensor 114 may alternatively be included in camera 104.

In some implementations, FOV adaptation may utilize face and/or object recognition. For example, face recognition may be performed to recognize a human target whose persistent image capture throughout changes in camera orientation is desired. A recognized face may be persistently tracked so that the corresponding user is present in image data captured at different camera orientations, whether a camera FOV is expanded or contracted, different clipped FOVs are generated so that substantially similar regions of interest are captured, or FOV adaptation is performed in any other suitable manner. Object recognition may be similarly performed to provide persistent tracking of non-human targets. In some examples, object recognition may be performed to recognize one or more features of the physical environment being imaged so that undesired FOVs adaptation is avoided—e.g., due to movement of human targets. Further, face(s) and/or object(s) may be recognized to identify changes in camera orientation. As such, orientation sensor 114 may be implemented as a face/object recognition algorithm.

Figure 3A:
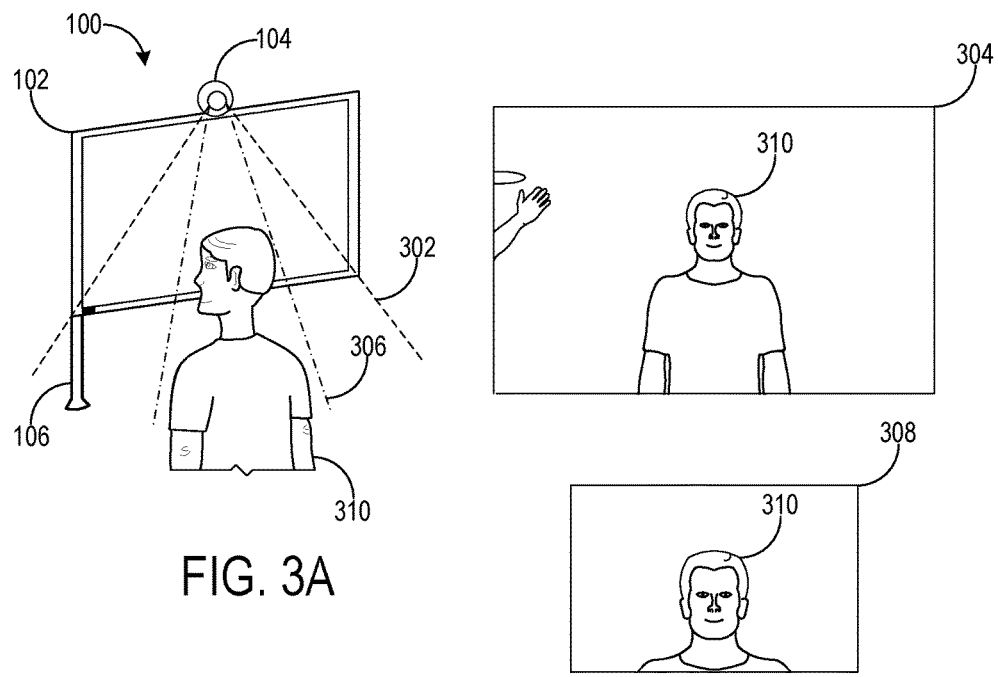
FIGS. 3A and 3B illustrate the persistent capture of a substantially similar region of interest.
Figure 3B:
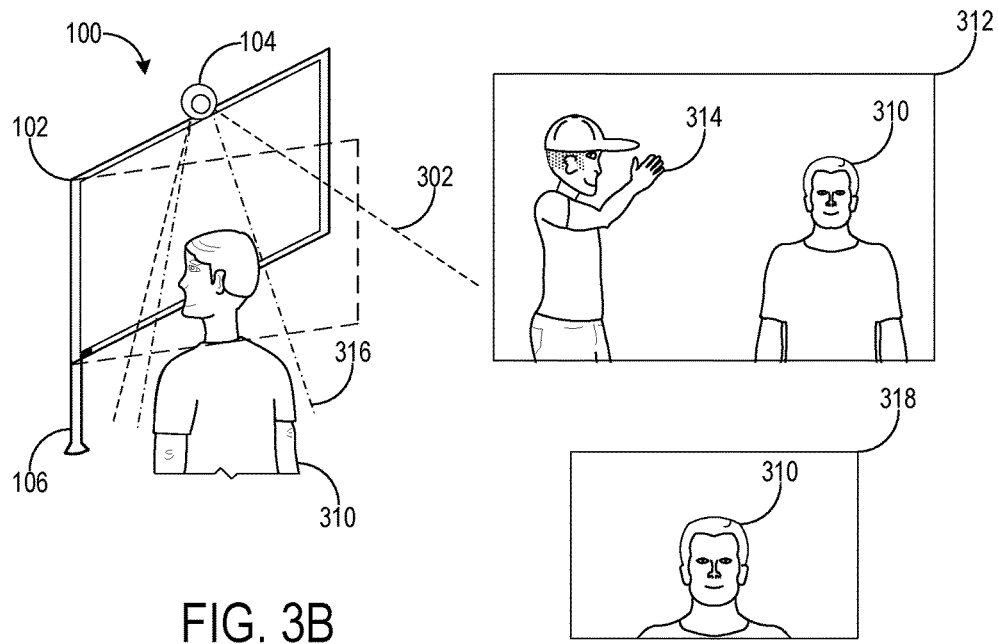

Turning now to FIGS. 3A and 3B, an example scenario is shown illustrating the generation of clipped FOVs to enable the persistent capture of a substantially similar region of interest in the presence of changes to camera orientation. As shown therein, camera 104 of display device 100 comprises an optical FOV 302 corresponding to a relatively large region of interest. Image data, which for example may assume the form of an image 304, may be captured using the entirety of optical FOV 302. However, a clipped FOV 306 that is a subset of optical FOV 302 may be generated (e.g., by controller 112 of FIG. 1A), with which a clipped image 308 may be captured. As with image 304, captured using optical FOV 302, clipped image 308 captured using clipped FOV 306 includes a user 310. As such, clipped images captured using clipped FOV 306 may reduce the processing, memory, and bandwidth load as described above if user 310 is a desired target for image capture. User 310, and/or other subjects, may be designated as targets for image capture in any suitable manner—e.g., user input may identify such targets.

User 310 may be persistently tracked despite changes in the orientation of camera 104. FIG. 3B shows display 102 and camera 104 in a rotated orientation relative to their orientation shown in FIG. 3A, produced for example by rotation enabled by movable mount 106. As can be seen in an image 312, the region of interest captured by optical FOV 302 of camera 104 now includes other scenery not visible in the orientation of FIG. 3A, such as a background user 314.

In response to the change in the orientation of camera 104, and in response to user 310 being designated as a target for image capture, the controller of display device 100 may generate a second clipped FOV 316 in which the user can still be imaged. In this example, second clipped FOV 316 is angularly offset from first clipped FOV 306 (e.g., to a degree in proportion to the rotation of camera 104 as measured by orientation sensor 114 of FIG. 1A). Image data, such as an image 318 including user 310, may be captured using second clipped FOV 316.

The example scenario illustrated in FIGS. 3A and 3B represents how targets can be persistently tracked in the presence of changes in camera orientation. The persistent tracking of targets may be performed by electronically adjusting an apparent centerline view of camera 104 via the generation of FOVs in response to target designation and orientation sensor output. To support the dynamic generation of FOVs across a wide angular range, camera 104 may comprise a relatively large FOV and/or resolution. Further, images 308 and 318, respectively captured using first and second clipped FOVs 306 and 316, represent how substantially similar sets of image data can be provided at different camera orientations. In such scenarios, users observing output from camera 104 may perceive substantially no change in such output when the camera is reoriented.

Figure 4A:
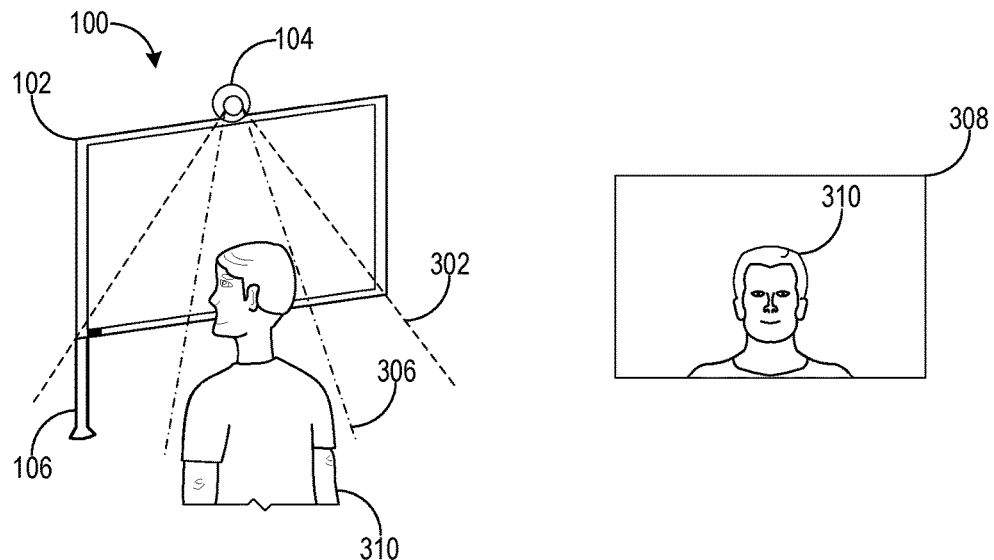
FIGS. 4A-4C illustrate the expansion of a clipped FOV in response to changes in camera orientation.
Figure 4B:
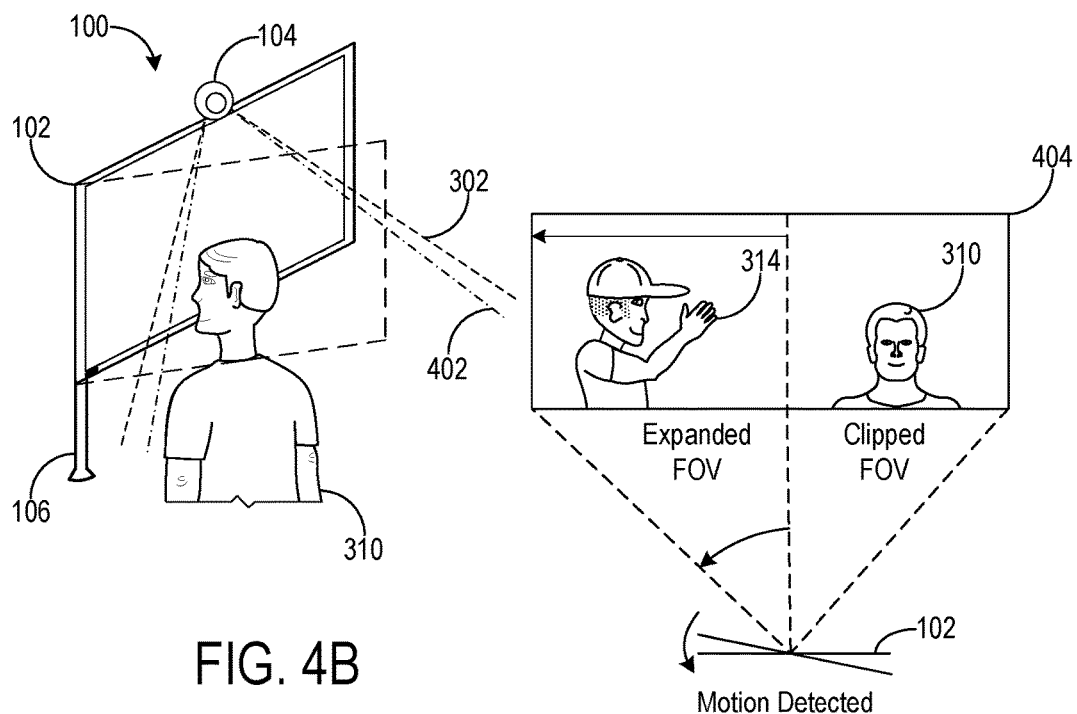

FIGS. 4A and 4B show an example scenario illustrating the expansion of a clipped FOV in response to changes in camera orientation. In this example, the controller of display device 100 may generate first clipped FOV 306 with which image 308 including user 310 may be captured, as described above in the example depicted in FIG. 3A. FIG. 4B shows the adjustment to the orientation of camera 104 relative to the orientation shown in FIG. 4A, similar to the adjustment made in FIG. 3B. In response to this change in orientation, however, the controller of display device 100 may additively expand first clipped FOV 306 to produce a relatively larger expanded FOV 402. Image data such as an image 404 may be captured using expanded FOV 402, which includes both user 310 and background user 314.

First clipped FOV 306 may be expanded to generate expanded FOV 402 to a degree proportional to the magnitude of the change in the orientation of camera 104. In some examples, the degree of expansion may be substantially equal to the magnitude of rotational change—e.g., the horizontal angular extent of expanded FOV 402 may be greater than the horizontal angular extent of first clipped FOV 306 by an angle substantially equal to the angle through which display device 100 is rotated to assume the rotated orientation in FIG. 4B relative to that of FIG. 4A. FOV expansion in alternative or additional axes/directions (e.g., vertical expansion) is contemplated, however, and while expanded FOV 402 is shown as a clipped FOV, examples are contemplated in which a clipped FOV is expanded to the entirety of optical FOV 302 of camera 104. Further, FOV expansion may be effected in any suitable manner. As an example, FIG. 1A shows a control 116 (e.g., button) included in display 102 and operable by a user to engage the additive mode of FOV adaptation. The user may actuate control 116 and, while maintaining actuation of the control, rotate display device 100 about movable mount 106. Controller 112 may expand an initial clipped FOV while button control 116 is actuated until actuation ceases or the FOV cannot be expanded further (e.g., as an angular extent of the optical FOV along at least one axis has been reached).

Other modes of FOV adaptation are contemplated. An FOV may be subtractively reduced to produce a relatively contracted FOV, for example. This mode of FOV adaptation may be a substantial inverse process of the additive mode of FOV expansion illustrated in FIGS. 4A and 4B—for example, expanded FOV 402 may instead be an initial FOV that is contracted to generate clipped FOV 306 in response to the adjustment of the orientation of display device 100 from the orientation of FIG. 4B to the orientation of FIG. 4A. Control 116 of FIG. 1A, for example, may be actuated to effect the reduction of expanded FOV 402 to a degree proportional to the change in display device orientation, until actuation ceases or a minimum FOV is reached (e.g., established based on user input, by display device 100).

Other modes of FOV adaptation may include a portrait/landscape switch mode. In this example, an initial clipped FOV may be generated to facilitate portrait (e.g., where the clipped FOV may have a vertical angular extent greater than a horizontal angular extent) or landscape (e.g., where the clipped FOV may have a horizontal angular extent greater than a vertical angular extent) image capture. In response to a change in display device orientation, a second FOV may be generated corresponding to the portrait or landscape mode that was not selected when the initial clipped FOV was generated. The switch between portrait/landscape image capture modes may be effected in any suitable manner, including based on user input effecting the switch, or in response to controller 112 (FIG. 1A) identifying that a mode switch may enable desired image capture. As an example, controller 112 may identify, via face recognition, that a switch from portrait to landscape mode may enable image capture of multiple targets as opposed to a single target that would be captured in the portrait mode.

Figure 4C:
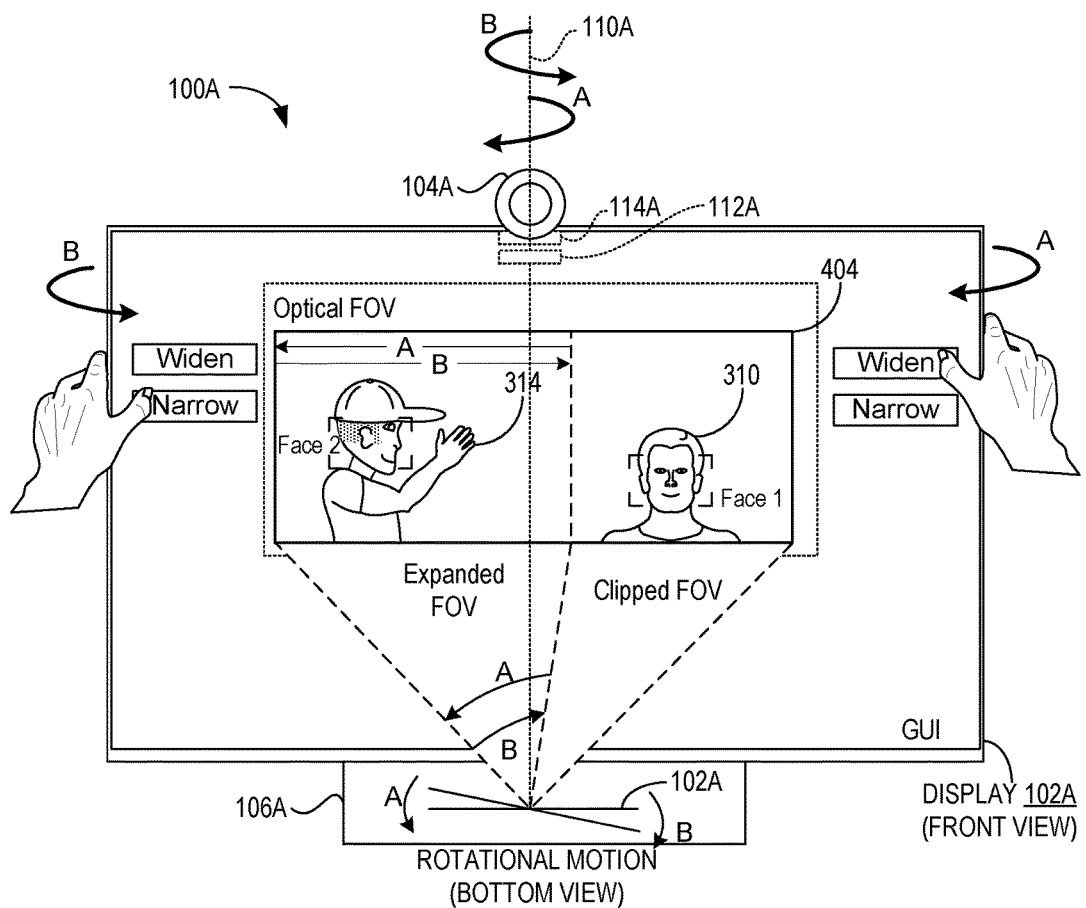

Turning now to FIG. 4C, a particular configuration of computing system including a display device 100A is shown, similar to the configuration in FIG. 1A. This configuration may be particularly useful when a user is attempting to widen or narrow a clipped FOV of a captured image when using an application program such as a VOIP videoconferencing program, to include or exclude another user from the clipped FOV of the camera. The graphical user interface (GUI) of the application program is illustrated, and includes a pane in which the clipped FOV is displayed. Optionally, selectors labeled "Widen" and "Narrow" may be positioned at a location such as on one or more sides of the GUI. In the depicted embodiment, these selectors are positioned adjacent the sides of the display 102A so that a user may grab the display 102A for rotation at the same time as touching the selectors, when a touch screen input is enabled for the application program. When the rotational movement of the display 102A is provided for along a horizontal axis, such as in a laptop screen which is hinged at a bottom side or in a monitor that is movable about both horizontal and vertical axes, the selectors may be positioned at other locations, such as at the top the screen, or along the side near the top, in a manner convenient for a user to both impart rotation to the display 102A and actuate the selectors. In the following manner, the selectors may be used while rotating the display 102A to either widen or narrow the clipped FOV. Alternatively, as described below, facial recognition may be used to intelligently determine whether to widen or narrow the clipped FOV.

Figure 6:
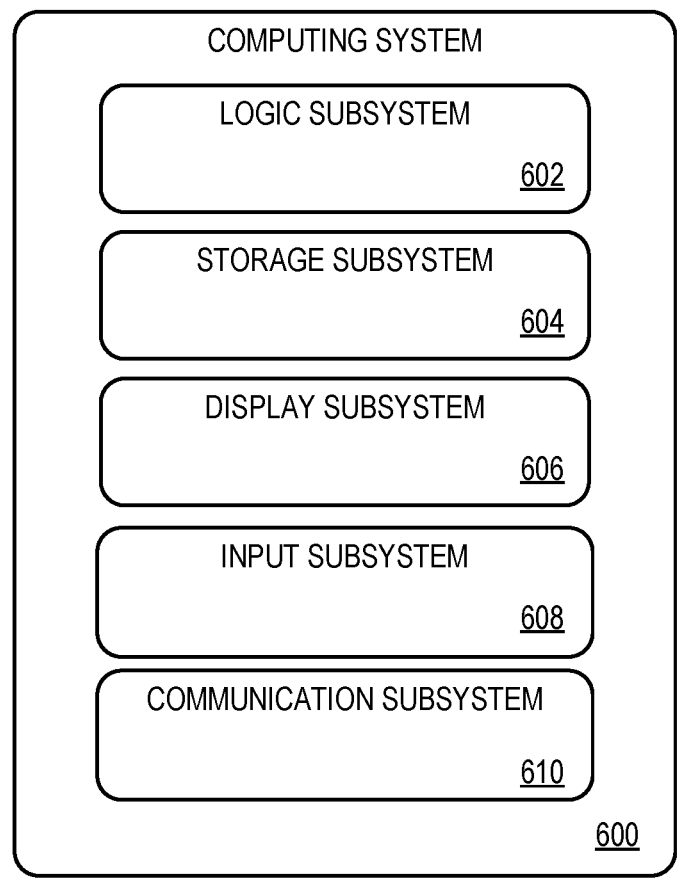
FIG. 6 is a block diagram of an example computing device.

As shown in FIG. 4C, display 102A is mounted via a movable mount 106A that is configured to support the display 102A and enable the display 102A to rotate about a rotational axis 110A, and in which a camera 104A is coupled to the display 102A at a fixed orientation and having an optical FOV (dashed) and an orientation sensor 114A fixedly coupled to the display 102A or camera 104A and configured to sense rotational movement of the one or both of the display 102A and camera 104A, which typically rotate in tandem due to being fixedly mounted to each other. A controller 112A may be provided, either within a housing of camera 104A or display 102A as depicted, or as a processor within an associated computing device, as shown in FIG. 6. The controller 112A, it will be appreciated is a processor of the type described in relation to FIG. 6 that is typically configured to perform the tasks described herein by executing instructions stored in nonvolatile memory. Controller 112A is configured to receive image output from the camera 104A, detect a rotational movement of the display 102A and camera 104A based on the output from the orientation sensor 114A about rotational axis 110A, and generate, based on the image output, a clipped FOV of the camera that changes based on the detected rotational movement of the display 102A and camera 104A.

In FIG. 4C, two types of motion are shown, indicated at various locations by the letters A and B. In motion A, the user is grabbing a side of display 102A and pulling it toward the user, which causes a rotation as indicated by A around the rotational axis 110A of the mount. The user may select the "widen" selector during this motion, to widen the clipped FOV to include the expanded FOV, which is within the actual optical FOV of the camera 104A. In motion B, the user is grabbing the other side of the display 102A and selecting the "Narrow" selector, which causes rotational motion B around axis 110A, which in turn causes the clipped FOV to be narrowed from the expanded FOV to the clipped FOV (i.e., so as to no longer include the expanded FOV).

Thus, the controller 112A is configured to generate the clipped FOV such that (a) the clipped FOV widens as the display 102A and camera 104A rotate when a widening input is detected; and (b) the clipped FOV narrows as the display 102A and camera 104A rotate when a narrowing input is detected. The widening input can be the user input described above that is input via a widening selector on the GUI of the application program displayed on the display 102A, as described above. Likewise, the narrowing input can be user input via a narrowing selector on the GUI of the application program as described above.

In an embodiment in which facial recognition is employed by the controller 112A, the widening input may be a facial recognition of a first face (e.g., FACE 1) within the clipped FOV and a second face (e.g, FACE 2) outside the clipped FOV but within the optical FOV. In particular, the when the controller 112A detects a face such as FACE 1 in the current clipped FOV, detects rotational motion, and detects a face outside of the current clipped FOV but in the direction of the rotation (i.e., in the direction of the panning of the rotation, or put another way, on a leading edge side of the panning direction) within the optical FOV, the controller 112A may be configured to maintain the trailing edge (in a panning direction) of the original clipped FOV sufficiently to keep the recognized first face (e.g., FACE 1) within the clipped FOV, while allowing the leading edge of the clipped FOV to be expanded under the influence of the rotational motion until it includes the second face (e.g. FACE 2) within the expanded FOV, as shown.

Similarly, the narrowing input can be a facial recognition of a first face (e.g., FACE 1) within the original clipped FOV but outside the recently expanded FOV, and also the recognition of an absence of a second face (e.g., FACE 2) anywhere within the optical FOV. Under these conditions, the controller 112A may be configured to allow the trailing edge of the clipped FOV (in the panning direction) to contract so as to no longer include the expanded FOV within the clipped FOV, since the expanded FOV is no longer necessary to capture an image of a second user, as the second user has left the scene.

As shown in FIG. 1D, display device 100 may comprise two or more cameras. The use of two or more cameras may enable an FOV adaptation mode in which image output from a first camera (or a subset of cameras) is blended with, or switched to, image output from a second camera (or a different subset of cameras) in response to changes in camera orientation. Image output from the two or more cameras may be dynamically selected to preserve image capture of a region of interest—for example with reference to FIGS. 3A and 3B, the controller of display device 100 may utilize image output from a first camera to capture user 310, and may switch to the utilization of image output from a second camera arranged in a different orientation to maintain capture of the user as the display device is rotated. For orientations in which the regions of interest of both cameras at least partially include user 310, output from both cameras may be blended (e.g., to provide a greater FOV than would be provided were output from one of the cameras used).

While the examples depicted in FIGS. 3A-4B illustrate changes to the orientation of display device 100 in the form of rotation, the approaches to FOV adaptation may alternatively or additionally apply to translation of the display device. In some examples, camera 104 (and additional cameras if included) may comprise an adjustable focus mechanism with which FOV adaptation can be performed. As an example, a substantially constant region of interest (and thus persistent tracking of target(s)) may be maintained throughout translation of display device 100 by adjusting the focus of camera 104.

Figure 5:
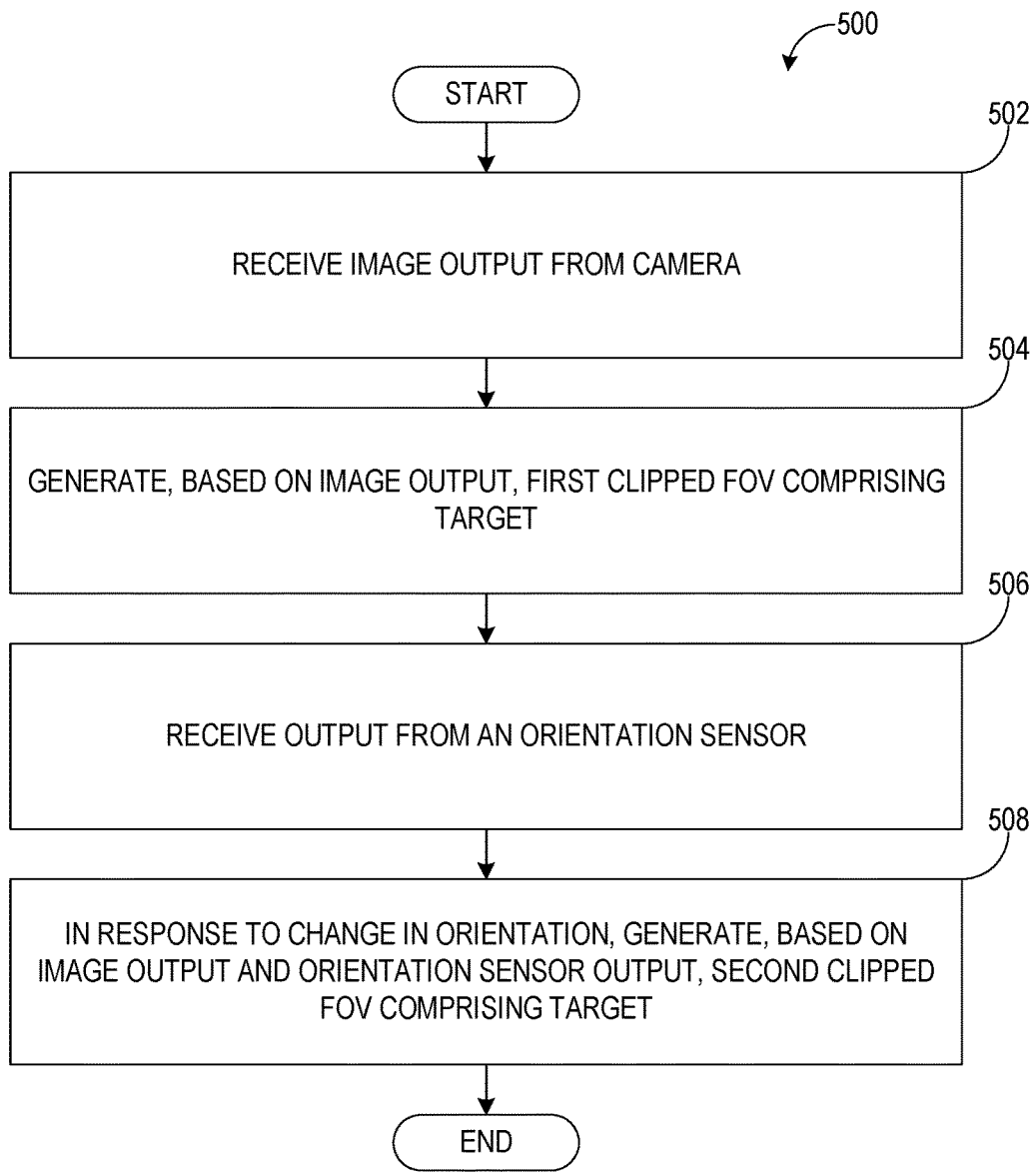
FIG. 5 shows an example image capture method.

FIG. 5 shows a flowchart illustrating an image capture method 500. Method 500 may be implemented on display device 100 of FIG. 1A, for example, and/or on display devices 100A-100C of FIGS. 1B-1E, respectively. As such, references to FIG. 1A are made throughout the description of method 500.

At 502, method 500 includes receiving image output from a camera. The camera may comprise an optical FOV, and may provide image output in the form of images and/or a sequence of images that form video. The camera may be camera 104 of FIG. 1A, for example, and may comprise optical FOV 302 of FIGS. 3A and 3B.

At 504, method 500 includes generating, based on the image output from the camera, a first clipped FOV comprising a target. The clipped FOV may be a subset of the optical FOV. Generating the first clipped FOV may include discarding image data (e.g., image pixels) outside of the first clipped FOV, which may be performed at firmware of the camera (e.g., firmware 204 of FIG. 2), an operating system running on the display device (e.g., operating system 206 of FIG. 2), or an application running on the display device (e.g., application program 208 of FIG. 2). The first clipped FOV may be first clipped FOV 306 comprising user 310, both of FIGS. 3A and 3B, for example.

At 506, method 500 includes receiving output from an orientation sensor. The orientation sensor may comprise one or more of an accelerometer, gyroscope, and compass, and in some examples may be implemented as an IMU. The orientation sensor may provide output in the form of measured acceleration, angular orientation, and/or direction relative to magnetic north. Alternatively or additionally, the orientation sensor may be implemented as a face and/or object recognition algorithm that recognizes features of an imaged environment to identify changes in camera orientation using image output from the camera. The orientation sensor may be orientation sensor 114 of FIG. 1A, for example.

At 508, method 500 includes, in response to a change in the orientation of the camera, generating, based on the image output from the camera and the output from the orientation sensor, a second clipped FOV comprising the target included in the first clipped FOV. Generating the second clipped FOV may include expanding or reducing the first clipped FOV. In one configuration, generating the second clipped FOV may include selecting the second clipped FOV such that a substantially similar region of interest is imaged as that imaged in the first clipped FOV. The second clipped FOV may alternatively be generated by switching a portrait/landscape image capture mode. In another configuration, generating the second clipped FOV may include selectively utilizing image output from one or more of two or more cameras. The second clipped FOV may be generated in a manner that an angular extent of the second clipped FOV differs from an angular extent of the first clipped FOV in proportion to a magnitude of rotation and/or a magnitude of translation measured by the orientation sensor. The second clipped FOV may be generated based on face recognition.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration. Logic machine 602 may comprise controller 112 of FIG. 1A, for example.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices. Display subsystem 606 may be display 102 of FIG. 1A, for example.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Input subsystem 608 may comprise camera 104 and/or orientation sensor 114, both of FIG. 1A, for example.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

The following paragraphs provide additional support for the claims of the subject application. One aspect provides a display device comprising a display, a movable mount, a camera having an optical field-of-view, an orientation sensor, and a controller configured to receive image output from the camera, generate, based on the image output, a first clipped field-of-view of the camera comprising a target, and in response to a change in an orientation of the camera identified by output from the orientation sensor, generate, based on the image output and the output from the orientation sensor, a second clipped field-of-view comprising the target, the first and second clipped field-of-views being subsets of the optical field-of-view. In this aspect, the orientation sensor alternatively or additionally may comprise a gyroscope. In this aspect, the orientation sensor alternatively or additionally may comprise a compass. In this aspect, the orientation sensor alternatively or additionally may be an orientation and position sensor comprising an accelerometer. In this aspect, generating the first and second clipped fields-of-view alternatively or additionally may include discarding image data outside of the first and second fields-of-view at one of a firmware of the camera, a processor executing an operating system on the display device, and a processor executing an application program on the display device. In this aspect, generating the second clipped field-of-view alternatively or additionally may include expanding the first clipped field-of-view such that an angular extent of the second clipped field-of-view is greater than an angular extent of the first clipped field-of-view. In this aspect, generating the second clipped field-of-view alternatively or additionally may include reducing the first clipped field-of-view such that an angular extent of the second clipped field-of-view is less than an angular extent of the first clipped field-of-view. In this aspect, an angular extent of the second clipped field-of-view alternatively or additionally may differ from an angular extent of the first clipped field-of-view in proportion to a magnitude of rotation measured by the orientation sensor. In this aspect, one of the first and second clipped fields-of-view alternatively or additionally may be generated in a portrait image capture mode, and the other of the first and second clipped fields-of-view alternatively or additionally may be generated in a landscape image capture mode. In this aspect, the camera alternatively or additionally may be a first camera, the display device alternatively or additionally may comprise a second camera, and generating the second clipped field-of-view alternatively or additionally may include selectively utilizing output from one or both of the first and second cameras. In this aspect, the generation of the second clipped field-of-view alternatively or additionally may be based on face recognition.

Another example provides an image capture method comprising receiving image output from a camera comprising an optical field-of-view, generating, based on the image output, a first clipped field-of-view comprising a target, receiving output from an orientation sensor, and, in response to a change in an orientation of the camera, generating, based on the image output and the output from the orientation sensor, a second clipped field-of-view comprising the target, the first and second clipped fields-of-view being subsets of the optical field-of-view. In this aspect, the orientation sensor alternatively or additionally may comprise a gyroscope. In this aspect, the orientation sensor alternatively or additionally may comprise a compass. In this aspect, the orientation sensor alternatively or additionally may be an orientation and position sensor comprising an accelerometer. In this aspect, generating the second clipped field-of-view alternatively or additionally may include expanding the first clipped field-of-view such that an angular extent of the second clipped field-of-view is greater than an angular extent of the first clipped field-of-view. In this aspect, generating the second clipped field-of-view alternatively or additionally may include reducing the first clipped field-of-view such that an angular extent of the second clipped field-of-view is less than an angular extent of the first clipped field-of-view. In this aspect, an angular extent of the second clipped field-of-view alternatively or additionally may differ from an angular extent of the first clipped field-of-view in proportion to a magnitude of rotation measured by the orientation sensor.

Another example provides a computing system comprising a display, a movable mount configured to support the display and enable the display to rotate about a rotational axis, a camera coupled to the display at a fixed orientation and having an optical field-of-view, an orientation sensor coupled to the display and configured to sense rotational movement of the display and camera, and a controller configured to receive image output from the camera, detect a rotational movement of the display and camera based on the output from the orientation sensor, generate, based on the image output, a clipped field of view of the camera that changes based on the detected rotational movement of the display and camera. In this aspect, the controller alternatively or additionally may be configured to generate the clipped field of view such that the clipped field of view widens as the display and camera rotate when a widening input is detected, and the clipped field of view narrows as the display and camera rotate when a narrowing input is detected, wherein the widening input is one of a user input via a widening selector on a GUI of an application program displayed on the display or facial recognition of a first face within the clipped field of view and a second face outside the clipped field of view but within the optical field of view, and wherein the narrowing input is one of a user input via a narrowing selector on the GUI of the application program or facial recognition of a first face within the clipped field of view and the absence of a second face within optical field of view.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display device, comprising:
   a display;
   a movable mount;
   a camera having an optical field-of-view;
   an orientation sensor; and
   a controller configured to receive image output from the camera, select, based on the image output, a first clipped field-of-view of the camera to thereby capture a target within the first clipped field-of-view, and in response to a change in an orientation of the camera identified by output from the orientation sensor, select, based on the image output and the output from the orientation sensor, a second clipped field-of-view to thereby capture the target within the second clipped field-of-view, the first and second clipped field-of-views being subsets of the optical field-of-view and being angularly offset from each other.

2. The display device of claim 1, wherein the orientation sensor comprises a gyroscope.

3. The display device of claim 1, wherein the orientation sensor comprises a compass.

4. The display device of claim 1, wherein the orientation sensor is an orientation and position sensor comprising an accelerometer.

5. The display device of claim 1, wherein selecting the first and second clipped fields-of-view includes discarding image data outside of the first and second fields-of-view at one of a firmware of the camera, a processor executing an operating system on the display device, and a processor executing an application program on the display device.

6. The display device of claim 1, wherein selecting the second clipped field-of-view includes expanding the first clipped field-of-view such that an angular extent of the second clipped field-of-view is greater than an angular extent of the first clipped field-of-view.

7. The display device of claim 1, wherein selecting the second clipped field-of-view includes reducing the first clipped field-of-view such that an angular extent of the second clipped field-of-view is less than an angular extent of the first clipped field-of-view.

8. The display device of claim 1, wherein an angular extent of the second clipped field-of-view differs from an angular extent of the first clipped field-of-view in proportion to a magnitude of rotation measured by the orientation sensor.

9. The display device of claim 1, wherein one of the first and second clipped fields-of-view is generated in a portrait image capture mode, and wherein the other of the first and second clipped fields-of-view is generated in a landscape image capture mode.

10. The display device of claim 1, wherein the camera is a first camera, the display device further comprising a second camera, and wherein generating the second clipped field-of-view includes selectively utilizing output from one or both of the first and second cameras.

11. The display device of claim 1, wherein the second clipped field-of-view is selected further based on face recognition.

12. An image capture method, comprising:
   receiving image output from a camera comprising an optical field-of-view;
   selecting, based on the image output, a first clipped field-of-view to thereby capture a target within the first clipped field-of-view;
   receiving output from an orientation sensor; and
   in response to a change in an orientation of the camera, selecting, based on the image output and the output from the orientation sensor, a second clipped field-of-view to thereby capture the target within the second clipped field-of-view, the first and second clipped fields-of-view being subsets of the optical field-of-view and being angularly offset from each other.

13. The method of claim 12, wherein the orientation sensor comprises a gyroscope.

14. The method of claim 12, wherein the orientation sensor comprises a compass.

15. The method of claim 12, wherein the orientation sensor is an orientation and position sensor comprising an accelerometer.

16. The method of claim 12, wherein selecting the second clipped field-of-view includes expanding the first clipped field-of-view such that an angular extent of the second clipped field-of-view is greater than an angular extent of the first clipped field-of-view.

17. The method of claim 12, wherein selecting the second clipped field-of-view includes reducing the first clipped field-of-view such that an angular extent of the second clipped field-of-view is less than an angular extent of the first clipped field-of-view.

18. The method of claim 12, wherein an angular extent of the second clipped field-of-view differs from an angular extent of the first clipped field-of-view in proportion to a magnitude of rotation measured by the orientation sensor.

19. A computing system, comprising:
   a display;
   a movable mount configured to support the display and enable the display to rotate about a rotational axis;
   a camera coupled to the display at a fixed orientation and having an optical field-of-view;
   an orientation sensor coupled to the display and configured to sense rotational movement of the display and camera; and
   a controller configured to receive image output from the camera, detect the rotational movement of the display and camera based on output from the orientation sensor, select, based on the image output, a clipped field-of-view of the camera that changes in angular range based on the detected rotational movement of the display and camera to thereby capture a target within the clipped field-of-view as the angular range changes.

20. The computing system of claim 19, wherein the controller is configured to generate the clipped field-of-view such that:
- (a) the clipped field-of-view widens as the display and camera rotate when a widening input is detected; and
- (b) the clipped field-of-view narrows as the display and camera rotate when a narrowing input is detected;

wherein the widening input is one of a user input via a widening selector on a GUI of an application program displayed on the display or facial recognition of a first face within the clipped field-of-view and a second face outside the clipped field-of-view but within the optical field-of-view; and wherein the narrowing input is one of a user input via a narrowing selector on the GUI of the application program or facial recognition of a first face within the clipped field-of-view and the absence of a second face within optical field-of-view.

\* \* \* \* \*